(12) United States Patent
    Puvvula et al.

(10) Patent No.: US 10,771,619 B1
(45) Date of Patent: *Sep. 8, 2020

(54) SYSTEMS AND METHODS FOR CONTEXT-AWARE APPLICATION AND CONTENT ACCESS CONTROL

(71) Applicant: Life360, Inc., San Francisco, CA (US)

(72) Inventors: Naveen Puvvula, Fremont, CA (US);
    Nitin Bhandari, Pleasanton, CA (US)

(73) Assignee: Life360, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,112

(22) Filed: Jul. 9, 2019

Related U.S. Application Data

(60) Provisional application No. 62/695,561, filed on Jul. 9, 2018.

(51) Int. Cl.
    *H04M 1/725* (2006.01)
(52) U.S. Cl.
    CPC ... *H04M 1/72577* (2013.01); *H04M 1/72566* (2013.01); *H04M 1/72569* (2013.01); *H04M 1/72572* (2013.01)
(58) Field of Classification Search
    CPC ......... H04M 1/72577; H04M 1/72566; H04M 1/72569; H04M 1/72572
    USPC ....................................................... 455/411
    See application file for complete search history.

(56) References Cited

U.S. PATENT DOCUMENTS

| | | | |
|---|---|---|---|
| 8,510,743 B2 | 8/2013 | Hackborn et al. | |
| 9,692,878 B1* | 6/2017 | Rosenthal | H04L 67/125 |
| 9,871,741 B2 | 1/2018 | Kurtzman et al. | |
| 9,985,850 B2 | 5/2018 | Qureshi | |
| 10,021,169 B2 | 7/2018 | Hendrick et al. | |
| 10,063,688 B1* | 8/2018 | Sinibaldi | H04M 1/72577 |
| 10,284,678 B2 | 5/2019 | Corson | |
| 2008/0020803 A1* | 1/2008 | Rios | H04M 1/667 |
| | | | 455/565 |
| 2012/0166788 A1* | 6/2012 | Racha | H04M 1/72577 |
| | | | 713/100 |
| 2013/0143528 A1* | 6/2013 | Randazzo | H04W 48/04 |
| | | | 455/411 |
| 2014/0141793 A1 | 5/2014 | Bello et al. | |
| 2014/0194146 A1 | 7/2014 | Yarvis | |
| 2014/0208397 A1 | 7/2014 | Peterson | |

* cited by examiner

*Primary Examiner* — William Nealon
(74) *Attorney, Agent, or Firm* — Womble Bond Dickinson (US) LLP

(57) ABSTRACT

Systems and methods for controlling application usage on a user device are disclosed. According to some embodiments, usage information is received from the user device. Whether one or more trigger criteria associated with a usage control mode are satisfied is determined based on the received usage information. If the trigger criteria are satisfied, application usage on the user device is controlled according to the usage control mode to reduce or eliminate distractions to the user. Otherwise if the trigger criteria are not satisfied, access to all applications is allowed on the user device.

20 Claims, 20 Drawing Sheets

800A

```
If (usage from an app) AND
(screen is not locked) AND
(duration_since_screen_first_unlocked >
min_threshold_in_seconds)AND
(current_hour_of_the_day >=
smart_mornings_start_hour AND
current_hour_of_the_day <=
smart_mornings_end_hour)
```

```
func checkForTrigger(_ state: ScreenLockStatus) {
guard isFeatureAllowed() else {
return
}
let now = Date()
if (state == .protected) {
if (state != screen_state) {
state_start = now
screen_state = state
}
return
}
// moving from lock to unlock
if (state != screen_state) {
state_start = now
screen_state = state
}
let hour_of_the_day =
Calendar.current.component(.hour, from: now)
if (hour_of_the_day<5 || hour_of_the_day>10) {
return
}
let time_since_unlocked =
now.timeIntervalSince(state_start)
if (time_since_unlocked < 60) {
return
}
if shouldSendStartToServer() {
// SMART_MORNINGS triggered
sendStartToServer()
}
}
```

820

```
// Checking for Blocked or Not
class QueryResult: NSObject {
let result: Bool
let handled: Bool
}
enum LookupResult {
case trustedDomains
case whitelist
case allowed
case blocked
}
func isBlocked(query: String) -> QueryResult {
guard isFeatureAllowed() else {
return QueryResult(result: false, handled: false)
}
let lookupResult = lookupInCache(key: query)
if lookupResult.found {
return QueryResult(result: lookupResult.value ==
.blocked,
handled: true)
}
// currently query is pending/awaiting
information
if fetchPending.contains(query) {
// isBlocked:1
return QueryResult(result: true, handled: true)
}
// default fallthrough: isBlocked:0
return QueryResult(result: false, handled: true)
}
```

```
If (usage from an app A) AND
(user is in School GeoFence OR (current_time >=
school_start_time AND
current_time <= school_end_time)) OR
(user_current_wifi.type = School)
```

```
user_schedule {
user_schedule_id: GUID,
user_id: GUID,
schedule_name: "SCHOOL MODE",
enabled: 1,
days_of_the_week: [Mon, Tue, Wed, Thu, Fri],
start_time_local: "9:00",
end_time_local: "3:00",
recurring: 1,
user_schedule_type_id: "school_mode"
}
```

```
public static void isBlocking(String appPackageName, Context context) {
if (isBlockingOn()) {
if (!getIgnoredApps(context).contains(appPackageName)) {
if (Tools.getSharedPreferences(context).getLockType() == SCHOOL_MODE) {
if (!getEducationalApps(context).contains(appPackageName)) {
// needs to be blocked
BlockingDialogActivity.startActivity(context);
}
} else {
// no blocking needed
}
}
}
}
private static void getFreshEducationalApps(final Context context) {
JSONObject request = new JSONObject();
List<String> listOfBlockingClasses = new ArrayList<>();
listOfBlockingClasses.add("Educational");
getBlockedEducationalAppsResponse = getListOfBlockedApps(device, user);
List<String> listOfEducationalPackages = new ArrayList<>();
for (BlockedApp blockedApp : getBlockedEducationalAppsResponse.body().apps) {
listOfEducationalPackages.add(blockedApp.unique_key);
}
educationalApps = new HashSet<>(listOfEducationalPackages);
Tools.getSharedPreferences(context).setLocalEducationalAppsList(listOfEducationalPackages);
}
```

```
IsUserInFamilyMode(user):
if (user is in Home GeoFence) OR
 current_time >= familymode_start_time AND current_time <=
familymode_end_time)
(user_current_wifi.type = Home)
UsersInFamilyMode() {
users = []
for each usr in account_users {
if IsUserInFamilyMode(usr) {
users.append(usr)
}
}
return users
}
users_in_family_mode = numberOfUsersInFamilyMode()
if users_in_family_mode.count() > 1 {
// trigger family mode for each of those users
for each usr in users_in_family_mode {
trigger_family_mode(usr)
}
}
```

```
user_schedule {
user_schedule_id: GUID,
user_id: GUID,
schedule_name: "FAMILY MODE",
enabled: 1,
days_of_the_week: [Mon, Tue, Wed, Thu, Fri],
start_time_local: "18:00",
end_time_local: "20:00",
recurring: 1,
user_schedule_type_id: "family_mode"
}
```

```
public static void isBlocking(String appPackageName, Context context) {
if (isBlockingOn()) {
if (!getIgnoredApps(context).contains(appPackageName)) {
if (Tools.getSharedPreferences(context).getLockType() == FAMILY_MODE) {
if (!getCriticalApps(context).contains(appPackageName)) {
// needs to be blocked
BlockingDialogActivity.startActivity(context);
 }
} else {
// no blocking needed
}
}
}
}
private static void getFreshCriticalApps(final Context context) {
JSONObject request = new JSONObject();
List<String> listOfAllowedClasses = new ArrayList<>();
listOfAllowedClasses.add("Critical");
getAllowedCriticalAppsResponse = getListOfCriticalApps(device, user);
List<String> listOfCriticalPackages = new ArrayList<>();
for (AllowedApp allowedApp : getAllowedCriticalAppsResponse.body().apps) {
listOfCriticalPackages.add(getAllowedCriticalAppsResponse.unique_key);
}
criticalApps = new HashSet<>(listOfCriticalPackages);
Tools.getSharedPreferences(context).setLocalCriticalAppsList(listOfCriticalPackages);
}
```

```
LocationType {
Home,
Work,
School,
After-hours-school
}
LocationEvent {
user: User,
type: LocationType,
enter_exit: Bool
time_epoch_utc: Integer,
timezone: String
}
 UserLocationEvents: Collection of LocationEvent for a user over a
period of time. These events are pruned after a set amount of
time.
```

```
func setUpGeofenceForLocation(location, locationType)
{
let center =
CLLocationCoordinate2DMake(location.latitude,location.longitude);
let region = CLCircularRegion(center: center, radius: 100, identifier:
location.name);
region.notifyOnExit = true;
region.notifyOnEntry = true;
locationManager.startMonitoring(for: region)
}
func locationManager(_ manager: CLLocationManager, didEnterRegion
region:
CLRegion)
{
// update the location monitoring system with the new information for
the
user
}
func locationManager(_ manager: CLLocationManager, didExitRegion
region:
CLRegion)
{
// update the location monitoring system with the new information for
the
user
}
```

```
geofencingClient?.addGeofences(getGeofencingRequest(), geofencePendingIntent)?
.run {
addOnSuccessListener {
// Geofences added
// ...
}
}
class GeofenceTransitionsIntentService : IntentService() {
// ...
override fun onHandleIntent(intent: Intent?) {
val geofencingEvent = GeofencingEvent.fromIntent(intent)
// Get the transition type.
val geofenceTransition = geofencingEvent.geofenceTransition
// Test that the reported transition was of interest.
if (geofenceTransition == Geofence.GEOFENCE_TRANSITION_ENTER |
geofenceTransition == Geofence.GEOFENCE_TRANSITION_EXIT) {
// update the location monitoring system with the new information for the
user
}
}
}
```

```
WifiType {
Home,
Work,
School,
FriendsPlace
}
WifiEvent {
user: User,
type: WifiType,
enter_exit: Bool
time_epoch_utc: Integer,
timezone: String
}
UserWifiEvents: Collection of WifEvent for a user over a period
of time. These events are pruned after a set amount of time.
```

```
func getWifiInformation()
{
val cm = context.getSystemService(Context.CONNECTIVITY_SERVICE) as
ConnectivityManager
val activeNetwork: NetworkInfo? = cm.activeNetworkInfo
val isConnected: Boolean = activeNetwork?.isConnectedOrConnecting == true
val isWiFi: Boolean = activeNetwork?.type ==
ConnectivityManager.TYPE_WIFI
return WifiInfo.getSSID()
}
For receiving the connecitivty state change events, CONNECTIVITY_ACTION (or its newer
API equivalents)
```

```
func getWifiInformation()
{
return NEHotSpotNetwork.ssid()
}
```

```
func wifiManager(didConnect ssid: String)
{
// update the Wifi monitoring system with the new wifi hotspot information
for the user
}
func wifiManager(didDisConnect ssid: String)
{
// update the Wifi monitoring system with the new wifi hotspot information
for the user
}
```

*FIG. 12D*

SYSTEMS AND METHODS FOR CONTEXT-AWARE APPLICATION AND CONTENT ACCESS CONTROL

CROSS REFERENCE TO RELATED APPLICATIONS

This application claims the benefit of U.S. Provisional Application No. 62/695,561 filed on Jul. 9, 2018, the disclosure of which is incorporated herein by reference.

TECHNICAL FIELD

Embodiments of the disclosure relate to software application usage and control, specifically relate to control of application usage on user devices.

BACKGROUND

Portable computing device usage takes up a significant portion of our everyday lives, to the extent that excessive portable computing device usage can affect a person's day-to-day activities and social relationships. Herein, the term "portable computing device" is used to denote computing devices, such as laptop computers, mobile phones, tablets, wearable devices, or any similar portable computing device. For example, portable computing device usage at a family dinner takes away from quality family time spent together. Portable computing device usage in academic environments can interfere with student learning and academic performance. Other times, portable computing device usage can be outright dangerous. For example, using a portable computing device while walking along a street can lead to dangerous conditions and possibilities of accidents.

There exists a need, therefore, for ways to limit or control portable computing device access in circumstances such as those described above.

BRIEF DESCRIPTION OF THE DRAWINGS

Embodiments of the disclosure are illustrated by way of example and not limitation in the figures of the accompanying drawings in which like references indicate similar elements.

FIG. 8A is an exemplary algorithmic implementation for triggering state change according to one embodiment.

FIG. 8B is an exemplary algorithmic implementation of a method for controlling usage of the user device according to one embodiment.

FIG. 9A is an exemplary algorithmic implementation for condition change according to one embodiment.

FIG. 9B is an example of a predefined schedule according to one embodiment.

FIG. 9C is another exemplary algorithmic implementation of a method for controlling usage of the user device according to one embodiment.

FIG. 10A is another exemplary algorithmic implementation for triggering state change according to one embodiment.

FIG. 10B is another example of a predefined schedule according to one embodiment.

FIG. 10C is yet another exemplary algorithmic implementation of a method for controlling usage of the user device according to one embodiment.

FIG. 11A is exemplary implementation of location information.

FIGS. 11B and 11C show exemplary algorithmic implementations to detect current location for iOS® and Android™ OS, respectively.

FIG. 12A is exemplary implementation of Wi-Fi information.

FIGS. 12B, 12C and 12D show exemplary algorithmic implementations for Wi-Fi connectivity changes on Android™ OS and iOS®.

DETAILED DESCRIPTION

Figure 1:
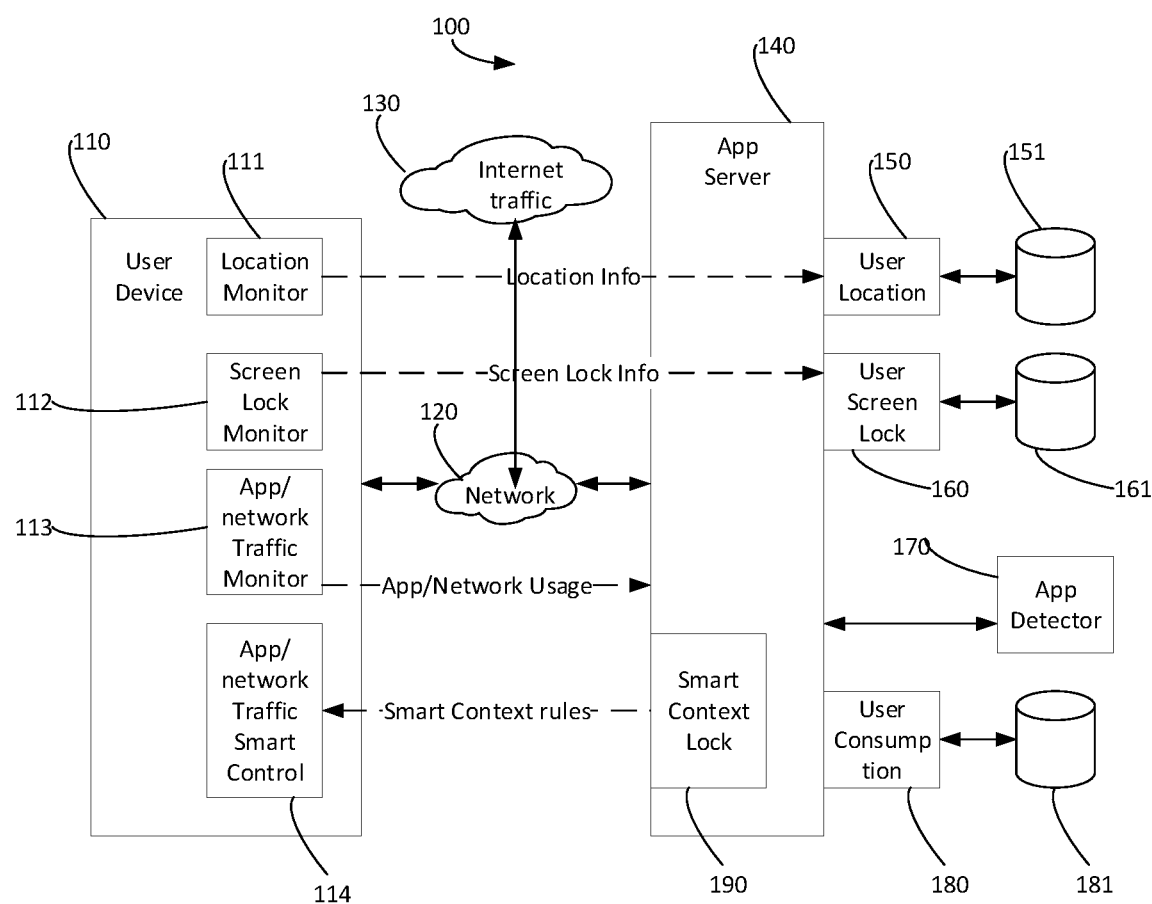
FIG. 1 is an exemplary block diagram of a context-aware control system to control usage on a user device according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Context-aware control systems and methods for controlling usage on a portable computing device are disclosed. The context-aware access control system described herein receives a variety of signals and inputs from a user of a portable computing device. The system then automatically estimates or predicts user behavior and generates and applies rules associated with portable computing device usage based on user scenarios. This system considers one or more of the following to make a decision: a user's age, digital usage behavior (duration and frequency), type of digital usage, such as categories of apps, time of day, and location of usage.

The main goal of the systems and methods described herein is to assist users limit digital distraction and create a better digital behavior. Examples of ways in which digital distraction is limited include:

- Assisting productivity/focus of an individual, kids, or an entire family.
- Creating a digital-distraction free environment for work, study, family time, etc.
- Create a safer and digital-distraction free environment while driving a vehicle, operating machinery, walking, etc.

As examples, consider the following cause-and-effect scenarios described below:

- A high frequency of application (also referred to as "app" or "software app") launches may result in the system turning off distracting apps not limited to social apps.
- High app usage may result in the system limiting entertainment app usage or limiting all app usage.
- Late-night portable computing device usage may result in the system turning off distracting apps to improve sleep quality and enforce calm nights.
- Heavy non-work/non-educational app usage when at home may result in the system turning on Family Mode where app usage is limited, as described herein.
- While driving a vehicle (or operating a train/flying a plane, etc.), system allows only critical apps and blocks distracting apps, e.g., social media and news.

The context/scenarios that the system uses are summarized in the Table 1 below.

TABLE 1

| Usage Control Mode | Trigger criteria | Action (example) | Result |
| --- | --- | --- | --- |
| Smart Mornings | Detect the first usage of the day based on network activity and (TIME) device lock state. (DEVICE INFO) | Allow full access for X mins and then block all distracting apps (e.g., social media, news, messaging, etc.) for Y mins. | Distraction free and productivity in the mornings |
| School Mode | Detect that a user is in school based on location geofence or LOCATION Manually set schedule (TIME) Based on school Wi-Fi access point connected or IP address (WIFI) | Allow only educational apps to work and block all distractions. | Distraction free and focus mode for Kids and enhance learning |
| Work Mode | Detect that a user is in office based on location geofence (LOCATION) Manually set schedule (TIME) Based on office/corp. Wi-Fi access point connected or IP address (WIFI) | Allow only work-related productivity apps to work and block all distractions. | Distraction free and productivity mode |
| Family Mode | Between certain times of the day (example 5 to 8PM) (TIME), When at home; based on location geofence (LOCATION) When at home based on home Wi-Fi access point connected or IP address (WIFI) Detect when many or all family members are in the same location | Trigger family time for X minutes: Allow only critical apps like phone and SMS to work and block everything else | Distraction free and family engagement improvement |
| Study Mode | a manually set schedule (TIME) usage of homework/study apps (TYPE of USAGE) | Allow only educational apps to work and block all distractions. | Distraction free and focus mode for Kids and enhance Learning |
| Drive Mode | Based on location (e.g., moving) Or connectivity (e.g. Bluetooth connected to car, etc.) | Allow only navigational and music apps to work and block all distractions | Safer and distraction free mode for operating vehicles, trains, planes etc. Can be extended to when operating heavy or critical machinery |
| Walk Mode | Based on location (e.g., moving) | Allow apps such as music to be allowed and block all distracting apps | Safer and distraction free walking mode |

Systems and methods for controlling application usage on a user device are described. According to some embodiments, usage information is received from the user device. Whether one or more trigger criteria associated with a usage control mode are satisfied is determined based on the received usage information. If the trigger criteria are satisfied, application usage on the user device is controlled according to the usage control mode to reduce or eliminate distractions to the user. Otherwise if the trigger criteria are not satisfied, access to all applications is allowed on the user device.

FIG. 1 is an exemplary block diagram of a context-aware control system to control usage of a user device according to one embodiment. Referring to FIG. 1, system 100 includes a user device 110 interfacing to an app server 140 via network 120. In one embodiment, user device 110 may be a mobile device (e.g. smartphone, tablet), a laptop computer, a desktop computer, a wearable device (e.g. smartwatch), a vehicle (e.g. autonomous vehicle), or the like.

Figure 2:
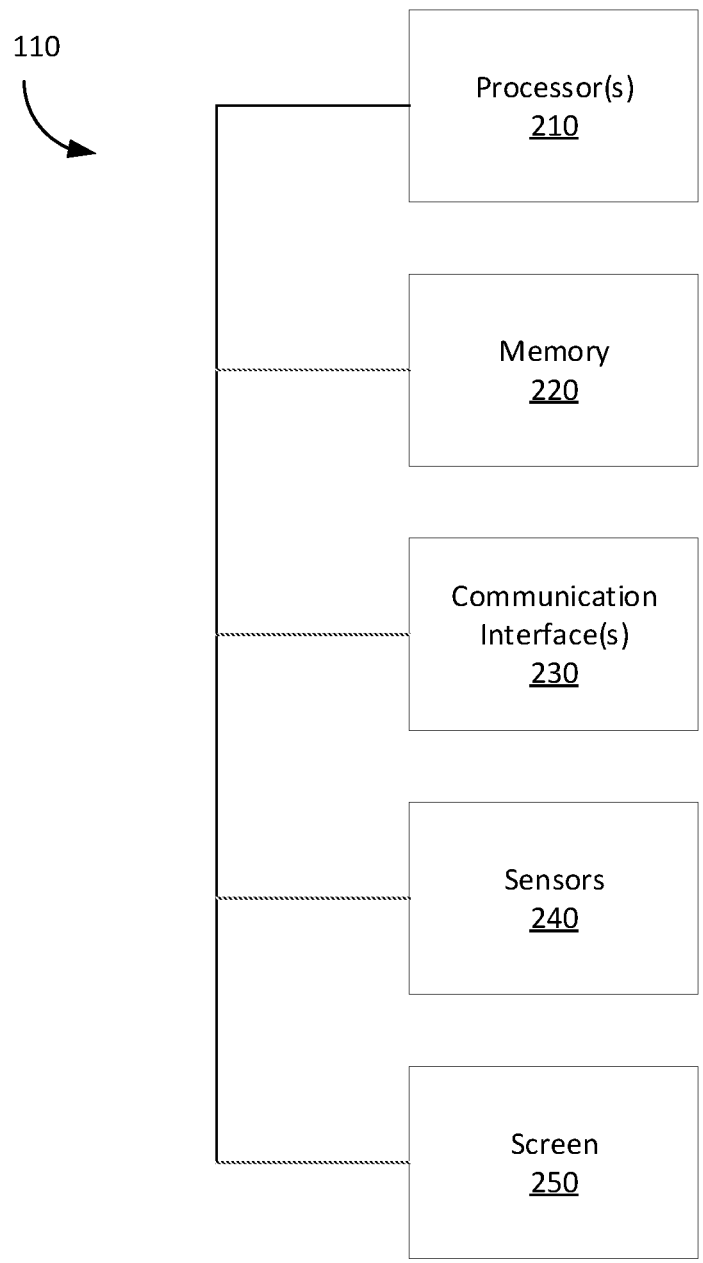
FIG. 2 is an exemplary block representation of a user device according to one embodiment.

Referring to FIG. 2, which shows an exemplary block representation of user device 110 in system 100 of FIG. 1. User device 110 may include one or more processors 210, memory 220, sensors 240 (e.g., global positioning system (GPS), gyroscope, accelerometer, etc.), and communication interfaces 230, such as 3G, 4G, 5G, long term evolution (LTE) modem, Wi-Fi, Ethernet, etc., and screen 250 (e.g., display, touch screen, video monitor, etc.). The user device 110 may be a computing device capable of running operating systems, such as iOS®, Android™, Windows®, Mac®, Chrome OS™, and so on.

Figure 3:
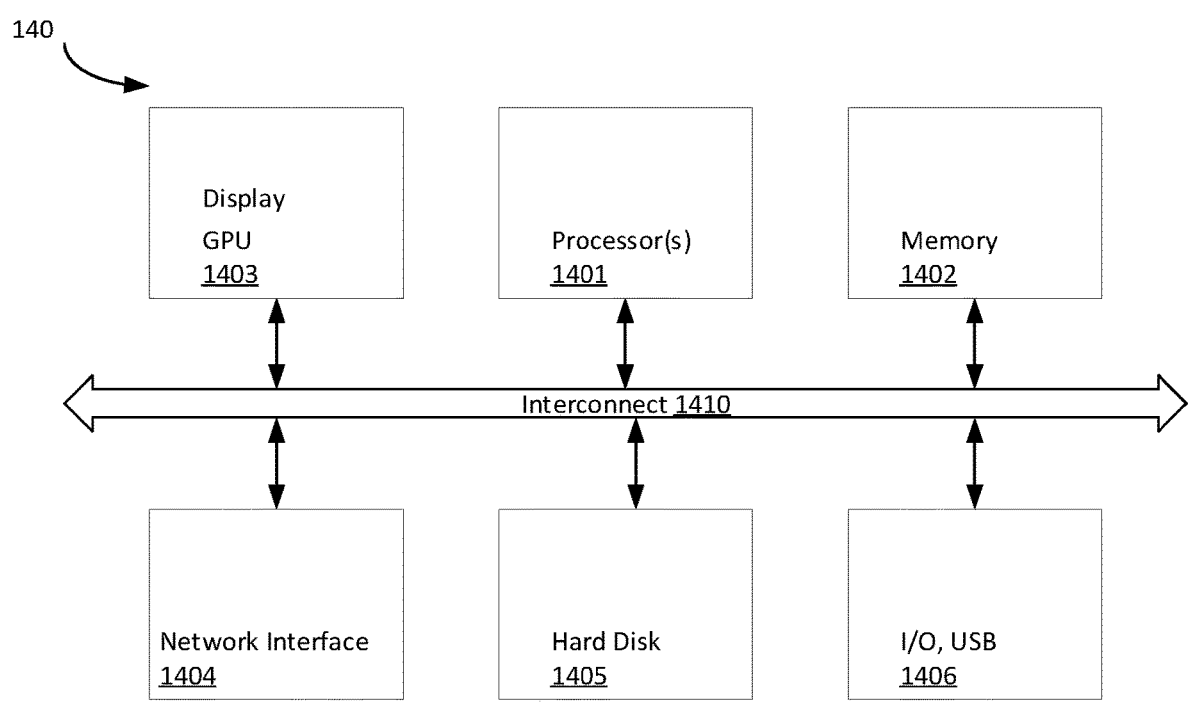
FIG. 3 is an exemplary block diagram of an application server according to one embodiment.

Referring to FIG. 3, which shows an exemplary block representation of app server 140 shown in system 100 in FIG. 1. As shown in FIG. 3, app server 140 may include discrete or integrated components. These components can be implemented as integrated circuits (ICs), other modules adapted to a circuit board, such as a motherboard or add-in card of the computer system, or as components otherwise incorporated within a chassis of the computer system. The various components include processor(s) 1401, memory 1402, network interfaces 1404, display 1403, storage (e.g., hard disk, solid-state drive (SSD)) 1405, I/O (e.g., universal serial bus (USB) or other peripherals) 1406, interconnect 1410, etc. Though not explicitly shown in FIG. 3, the app server 140 may include a multiplicity of servers (or cluster of servers) to run multiple databases.

Referring back to FIG. 1, user device 110 has several modules—location monitor 111, screen lock monitor 112, app/network traffic monitor 113, Wi-Fi monitor (not explicitly shown), etc. that communicate data to app server 140 via network 120. For example, location monitor 111 sends location information associated with user device 110 to app server 140. User location data may be obtained from a GPS receiver (sensor 240) in the user device 110 or any method provided by the operating system. This user location information is used by a user location module 150 associated with app server 140 to interpret a context-sensitive location associated with the user. A location database 151 stores location history associated with this user. This location history can be used by the user location module 150 to enhance the interpretation of context-sensitive location results. In another embodiment if location monitor is not available on the portable computing device, the location information can be deduced from other sources, such as IP address, Wi-Fi location or user inputs. In some embodiments, location module 150 can either be part of app server 140 or be part of device 110.

Screen lock monitor 112 (which may be optional in some embodiments) associated with the user device 110 sends status updates about screen lock associated with the user device 110 to the app server 140 via network 120. In other words, the screen lock monitor 112 sends information indicating whether the screen of user device 110 is locked or unlocked. A user screen lock state, in one embodiment, helps refine app usage detection in eliminating any background noise and unwanted traffic. In another embodiment, a user screen lock module 160 associated with the app server 140 receives this information and processes the information along with a screen lock history from a screen lock database 161 to determine whether an application (or app) should be temporarily blocked. For example, a history of prolonged unlocked screen states may suggest excessive app usage and may trigger the system 100 to lock an app or set of apps. In one embodiment, the screen lock information is generated by the screen lock monitor 112 by using operating system (OS) calls. In another embodiment, the system 100, among other ways, deduces from the transfer size—where a small periodic transfer may indicate that app is communicating with internet and user associated with device 110 is not actually performing the data transfer and that the screen is locked.

App/network traffic monitor 113 on user device 110 transmits app usage data and/or network traffic data to the app server 140 via network 120. A user consumption module 180 associated with app server 140 reads this data. The user consumption module 180 also reads app/network traffic monitor history data from a usage database 181 that provides insight into a past history of app and network usage by the user. The user consumption module receives data from an app detector 170 that is configured to identify one or more apps that are being used by a user (e.g., Facebook®, Twitter®, etc.). The user consumption module 180 generates details about the app usage, such as its category, duration of usage, etc.

A smart context lock module 190 associated with the app server 140 determines whether one or more trigger criteria are met with respect to having to limit access to one or more apps on the user device. Different trigger criteria are discussed herein. If one or more trigger criteria are met, then the smart context lock module 190 communicates with app/network smart traffic control module 114 associated with user device 110 which, in turn, blocks one or more apps on user device 110 to prevent a user of the user device 110 from opening up and using those apps. In another embodiment, app/network smart traffic control 114 can also be executed or run on app server 140. In yet another embodiment, smart context lock module 190 can be executed or run on user device 110.

Smart Mornings

In one embodiment, system 100 detects the first usage of the day and applies a control action on the app usage. This usage control mode may be referred to as "Smart Mornings".

Figure 4:
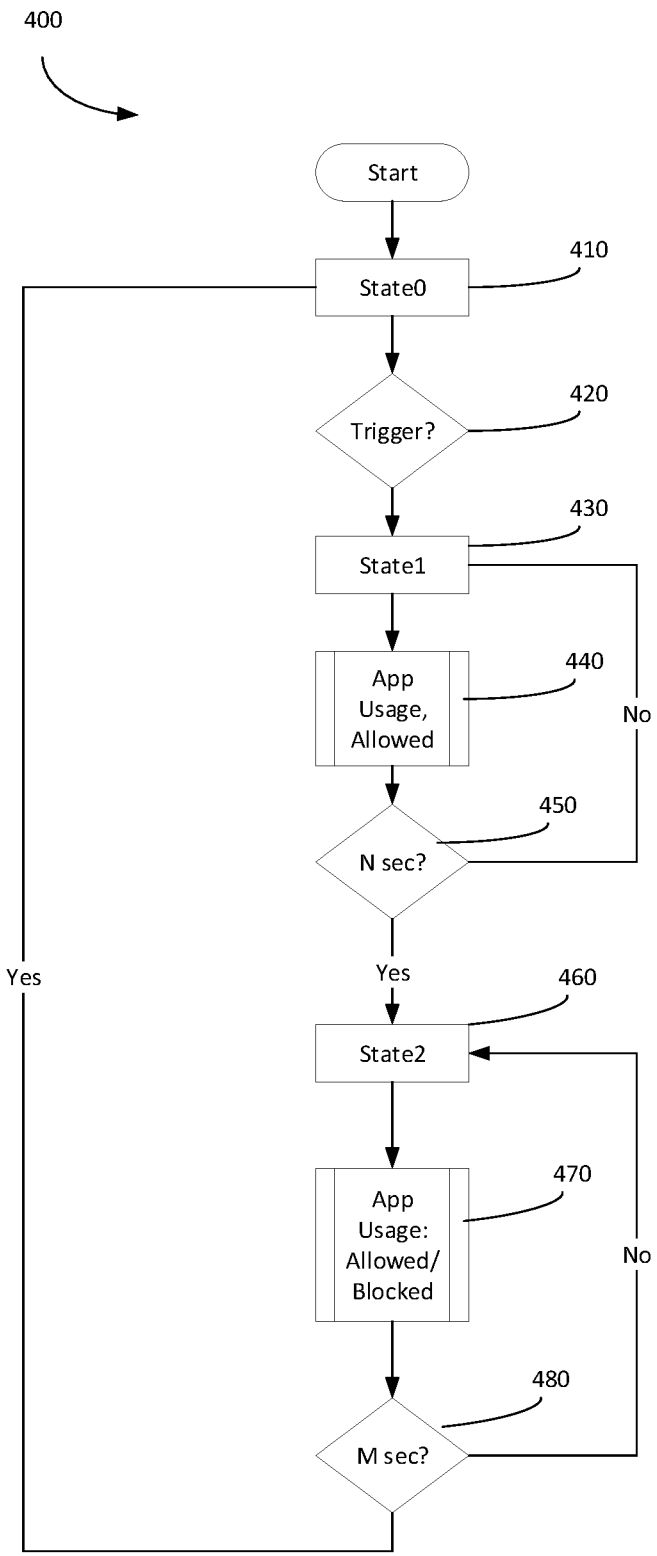
FIG. 4 is an exemplary flow chart of a method for controlling usage of the user device according to one embodiment.

The Smart Mornings algorithm detects a scenario based on usage information (e.g., network traffic, screen (or device) lock/unlock state, time of the day). Once a condition or set of conditions are triggered (triggering criteria are explained later herein below), blocking/rationing action is performed. In one embodiment, the algorithm allows access to all apps for N seconds, and then blocks all distracting apps (e.g., social media, news, messaging, etc.) for M mins. This is illustrated in the flowchart of FIG. 4 and described further below:

1. Method 400 starts at block 410, where the user device 110 is in normal state and designated as STATE0. STATE0 can also be termed as "SMART MORNINGS OFF" state.

2. In block 420, based upon application usage on user device and whether triggering criteria are satisfied, method 400 moves to block 430 designated as STATE1. At block 430, Method 400 may notify the user that a group of user's app usage will be rationed or disabled soon or in 'N' seconds (block 440). Method 400 will allow the usage of apps in this state. STATE1 can also be termed as "SMART MORNINGS WAITING" state. In STATE1, for the next 'N' seconds, app usage is allowed normally.

3. After being in STATE1 for 'N' seconds (block 450), device/user goes into block 460, where method 400 blocks/rations distracting apps (e.g., social media, news, messaging) (block 470) and is designated as STATE2. STATE2 can also be termed as "SMART MORNINGS ON" state. In STATE2, for the next 'M' seconds (block 480), the blocking/rationing continues.

4. After being in STATE2 for 'M' seconds, method 400 transitions back to block 410 (STATE0).

In one embodiment, the user of device 110 can choose to skip the current Smart Mornings once (per day). In another embodiment, the user of device 110 can choose to skip the Smart Mornings for a maximum number of "W" times per day. User of device 110 can configure the behavior of method 400 such that the user can select a number of times the Smart Mornings feature can be skipped. In one embodiment, the user configures the wait times ("N" seconds (block 440) and "M" seconds (block 480)). In another embodiment, the system 100 automatically configures the wait times ("N" seconds (block 440) and "M" seconds (block 480)) based upon the usage history. In yet another embodiment, the wait times ("N" seconds (block 440) and "M" seconds (block 480)) are further refined upon the device screen being locked or unlocked. For example, if the user starts an app that triggers the timer (block 450), but system 100 and method 400 detect that the device 110 screen is locked. This indicates that the user is not actively using the app (or apps). In one embodiment, method 400 pauses the timer ("N" seconds (block 450)). In another embodiment, the method 400 resets the timer ("N" seconds (block 450)).

In one embodiment, the method 400 is limited to:
Only once per day
Only during the mornings between certain hours The above logic of monitoring, detection and control of apps (i.e., smart context lock module 190 and app/network traffic smart control module 114) can run either on server 140 of the system 100 or on user device 110 or can be shared between both. Also, a user has the option to skip the blocking feature for 'n' times per day. In some embodiments, the Smart Mornings feature and associated triggering logic either can be enabled automatically by the system or based on a user action.

App usage herein may be referred to as:
A particular instance of app,
A host representing usage from an app or a background service, or
A host coming from a browser, such as Safari®, Chrome™, Firefox™, Internet Explorer®.

One condition of triggering the transition from STATE0 (block 430) to STATE1 (block 460) is shown below:
For example, in the morning, between certain hours (e.g., 5 AM -10 AM), if used for certain duration (amount of usage, e.g., 30 seconds), and if this is first usage of the day:
S: Let S be the group of apps that are installed on the user device (or web traffic)
G: Let G be the group of apps that are being monitored and not allowed during STATE1
A: Let A be the current app detected
FIG. 8A shows an exemplary condition that triggers state change according to method 400 of FIG. 4.
G (group of apps), for example
All apps installed on the user device
A single app on the user device Apps based on a particular category of apps (e.g., social, messaging, distraction)
Custom sub-set of apps based on a selection by a user
FIG. 8B is an exemplary algorithmic implementation of method 400 of FIG. 4.

Figure 5:
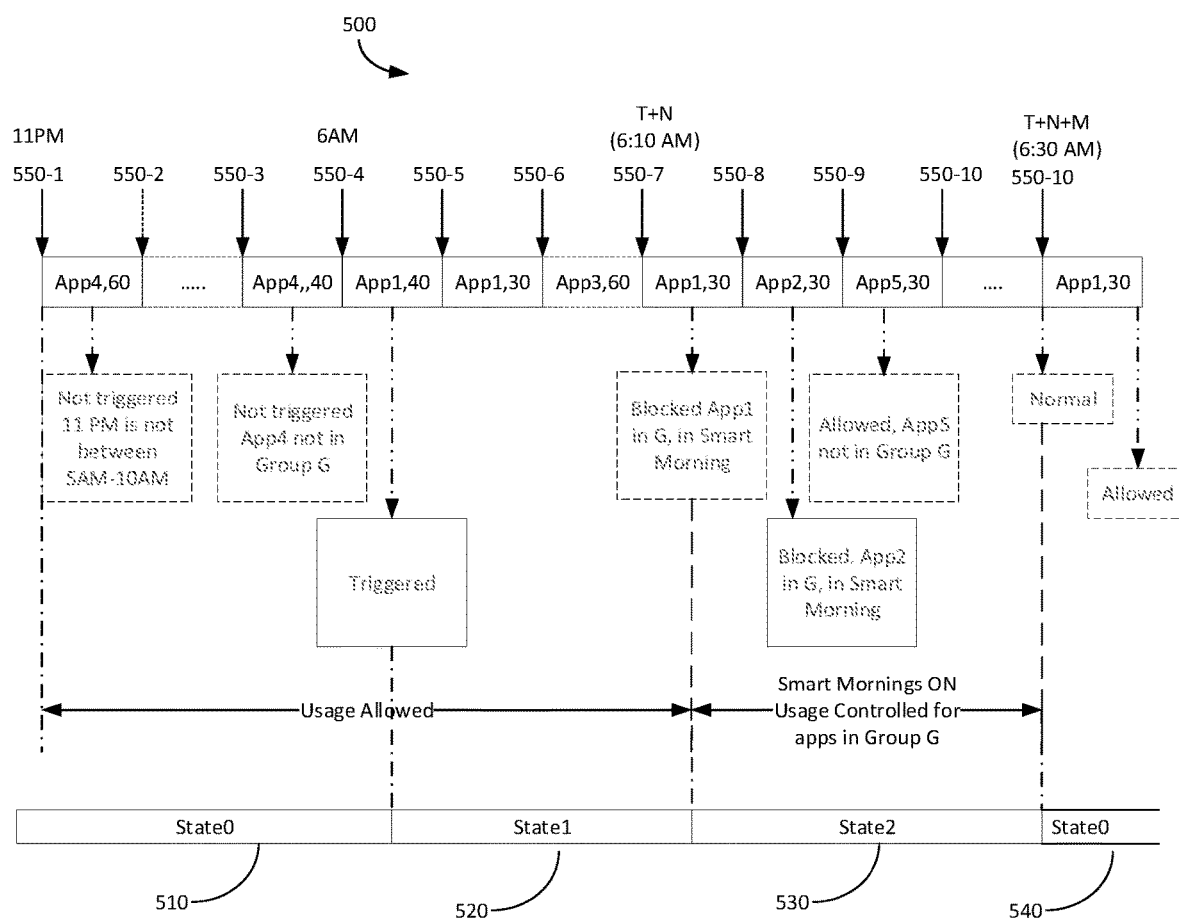
FIG. 5 is an exemplary timeline to control application usage on the user device according to one embodiment.

FIG. 5 is an exemplary timeline of app usage on user device 110 as controlled by method 400. Each arrow represented by 550-1, 550-2 ... 550-10 corresponds to app usage on user device 110. In the exemplary timeline shown, the list of apps installed on user device includes: App1, App2, App3, App4, App5, and App6. App1 and App2 are the apps to be blocked in Smart Mornings (G=App1, App2). Smart Mornings is triggered (in this exemplary timeline) between 5 AM and 9 AM and the minimum threshold x=30 seconds. At around 11 pm shown by arrow 550-1, App4 is accessed for 60 seconds. This corresponds to State0 (510) where usage is allowed, as the time 11 pm is not within the time interval of 5 am to 10 am that is associated with the Smart Morning mode. Sometime at during the night, before 5 am, App4 (pulse 550-3) is accessed again for 40 seconds. Again, the system remains in State0, as the access time is outside the time interval associated with the Smart Morning mode. Shortly after 6 am, App1 (pulse 510-4, or pulses) is accessed. This corresponds to a trigger condition for the Smart Morning Mode, as 6:00 AM is between the designated 5:00 AM and 9:00 AM associated with the Smart Morning Mode. The system is now in State1 (520). App usage is still allowed till a time T+N (around 6:10 am). During State1, App1 is used for 40 seconds (pulse 510-4), and then for again for another 30 seconds (pulse 510-5). Note that App1 is in group G. During the time period from T to T+N, App3 is also used for 60 seconds (pulse 550-6). At T+N, triggers a condition that causes the system 100 to move to State2 (530), where Smart Monitoring is on and all apps in group G are blocked. Hence, a request to use App2 (pulse 550-8) that is also in set G is blocked by the Smart Morning Mode. On the other hand, a request to use App5 (550-9) is allowed because App5 is not in Group G. At a time, T+M+N, i.e., at around 6:30 am, the system reverts to State0 (540), which is the normal state of operation. Access to App1 (pulse 550-10) is now allowed, and the process continues throughout the duration that Smart Morning Mode is enabled.

School Mode

In one embodiment, the system 100 detects a user of device 110 is at school and allow only educational apps and critical apps and limits (or blocks) the usage of remaining apps. This usage control mode may be referred to as "School Mode".

In one embodiment, the algorithm detects School Mode based on usage information, such as network traffic, time of the day (e.g., school schedule), location (e.g., school geofence), and so on. Once a condition or set of conditions are triggered, blocking/rationing action on apps is performed, such that all critical apps (e.g., phone, SMS) and educational apps/content are allowed, and all remaining usage is blocked.

Figure 6:
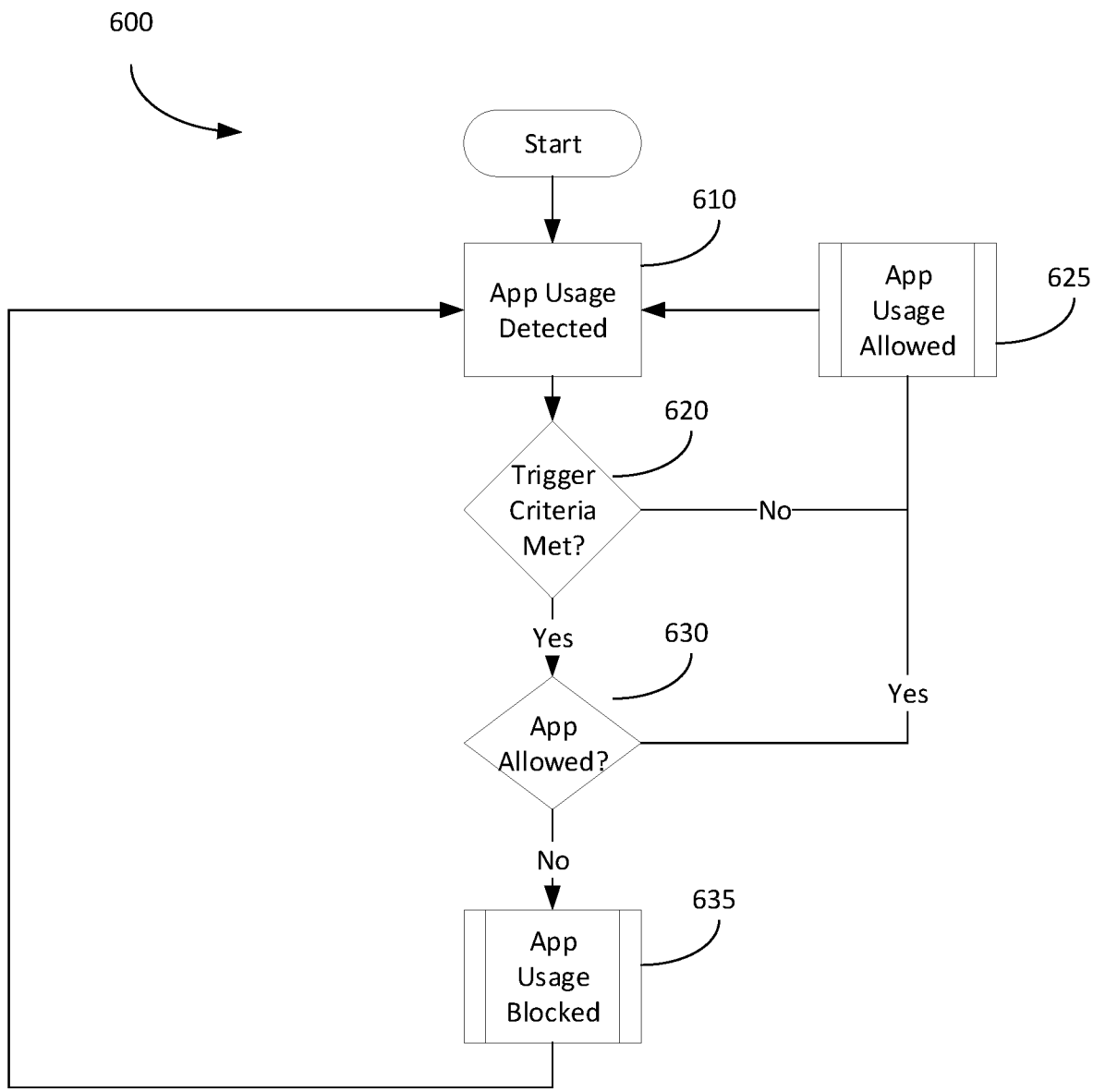
FIG. 6 is an exemplary flow chart of another method for controlling usage of the user device according to one embodiment.

FIG. 6 is an exemplary flow chart of a method for controlling usage of the user device 110 operating in School Mode. Referring to FIG. 6, method 600 starts at block 610 where the usage of the apps is detected by system 100. Method 600 queries and fetches category information of usage (both apps and websites). System 100 also maintains a local cache of the app-category or host-category mapping. At block 620, method 600 checks to see if the criteria for School Mode are met. In one embodiment, method 600 checks the location of the user device 110 to see if the location matches that of a school, and also checks the user's school schedule.

FIG. 9B is an example of a predefined schedule used in method 600 shown in FIG. 6. Though not explicitly shown in FIG. 9B, the schedule may include holidays (e.g., summer, winter, spring break, etc.) and also other details, such as minimum day, etc. FIG. 9A is an exemplary algorithmic implementation for a condition change according to method 600. In FIG. 9A, "A" refers to a current app being accessed, "G" refers to a list (or group) of allowed apps in School Mode, and "S" refers to a list of apps installed on device 110.

Referring back to FIG. 6, at block the 625 after method 600 determines that criteria for school mode are not met, allows the app usage. At block 630, method 600 checks the category information of the app currently being used on device 110 to see if it matches list of allowed apps (e.g., educational apps/content, SMS, etc.) provided by smart context lock module 190/app server 140, and accordingly allows (block 625) or blocks (block 635) the apps. In one embodiment, the user of device 110 is allowed further refinements to the schedule where the user can add breaks to the school schedule (e.g., brunch, lunch, etc.). In one embodiment, method 600 (School Mode) is disabled during the breaks added by the user.

FIG. 9C is an exemplary algorithmic implementation of method 600. FIG. 9C shows an example implementation for a local cache of the app-category or host-category mapping.

Work Mode

Work Mode is similar to School mode. Here, geofencing is associated with a workplace location. Other context-related parameters may include, but not limited to, a user logging onto a Wi-Fi access point associated with a work location. Instead of educational apps, productivity and work-related apps are allowed by the Work Mode. A user of device 110 can define a work schedule (similar to the school schedule described previously). In one embodiment, system 100 automatically determines user's work schedule based on historical data.

Family Mode

In one embodiment, system 100 detects a user of device 110 of an account is in their home (or vacation) and allow only critical/essential apps and control (e.g., block) the usage of remaining apps. This usage control mode may be referred to as "Family Mode".

In one embodiment, the algorithm detects a scenario based on usage information, such as network traffic, time of the day (e.g., if users set a family time schedule), location (e.g., home geofence), Wi-Fi access point (e.g., home access point). Once a condition or set of conditions are triggered, blocking/rationing action is performed such that all critical apps (e.g., phone, SMS) are allowed, and all the remaining usage are blocked. In another embodiment, the rules and conditions can be set by users. This action can be taken on devices used by one or multiple family members based on user preference.

Figure 7:
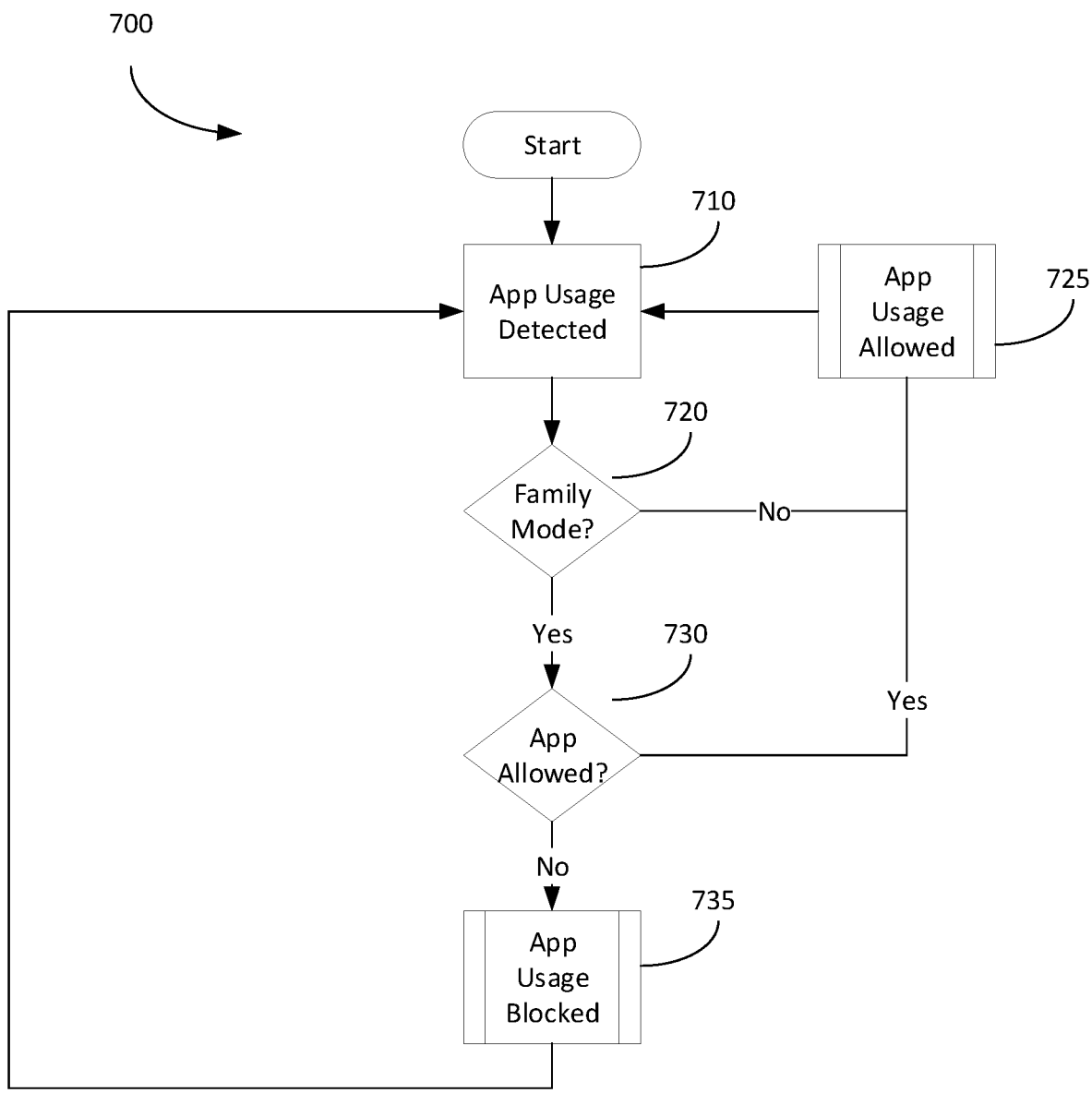
FIG. 7 is an exemplary flow chart of yet another method for controlling usage of the user device according to one embodiment.

FIG. 7 is an exemplary flow chart of a method for controlling usage of user device 110 operating in Family Mode. Referring to FIG. 7, method 700 starts at block 710 where the method 700 detects the usage of app detected using, for example, app detector 170. At block 720, the method 700 determines if Family Mode is set. The various conditions to check whether Family Mode is set include, but not limited to: a location that matches user's home, a connection to user's home Wi-Fi, a time period during family hours (previously set), and/or information indicating more than one family member user at home. Family member may be defined by the user of device 110, or setup automatically by system 100. In one embodiment, Family Mode can be set automatically when two or more family members are at home. FIG. 10B is an example of pre-defined schedule according to method 700. Referring back to FIG. 7, at block the 725 after method 700 determines Family Mode is not set, method 700 allows app usage. At block 730, method 700 checks the category information (provided by smart context lock module 190/app server 140) of the app currently being used on device 110 to see if it matches a list of allowed apps (e.g., educational apps/content, SMS etc.) and accordingly allows (block 725) or blocks (block 735).

FIG. 10A is an exemplary algorithmic implementation for triggering state change according to method 700. FIG. 10C is an exemplary algorithmic implementation of method 700.

Study Mode

In one embodiment, system 100 allows only educational apps and critical apps and limits (blocks) the usage of rest of the apps based upon a manually set schedule. This usage control mode may be referred to as "Study Mode". Study Mode allows a user of device 110 to use the time for homework/study without distractions.

Driving Mode

In one embodiment, system 100 detects a user of the device 110 is driving and allows only navigation and music apps and blocks usage of remaining apps. This usage control mode may be referred to as "Driving Mode". This mode allows for a distraction free and safe operating mode. In one embodiment, system 100 detects that the user of device 110 is driving based on, for example, a change of location of device 110 and/or the rate of change. The rate of change of location can be determined from change in location and computed by server 140 or can be based upon data received from sensors 240 of device 110. In another embodiment, system 100 detects that user is driving based upon a wireless connectivity (e.g. user device 110 is connected to a vehicle's entertainment system via a Bluetooth connectivity). Once system 100 detects that the user is driving, it may block all distracting apps and provide a safer driving environment. The driving mode can be extended to other environments, such as the user is operating a train, flying a plane/helicopter, or operating heavy or critical machinery. In case the Driving Mode is extended to the case where the user of device 110 is operating heavy or critical machinery, it can be based on rules and conditions set by the user.

Figure 13:
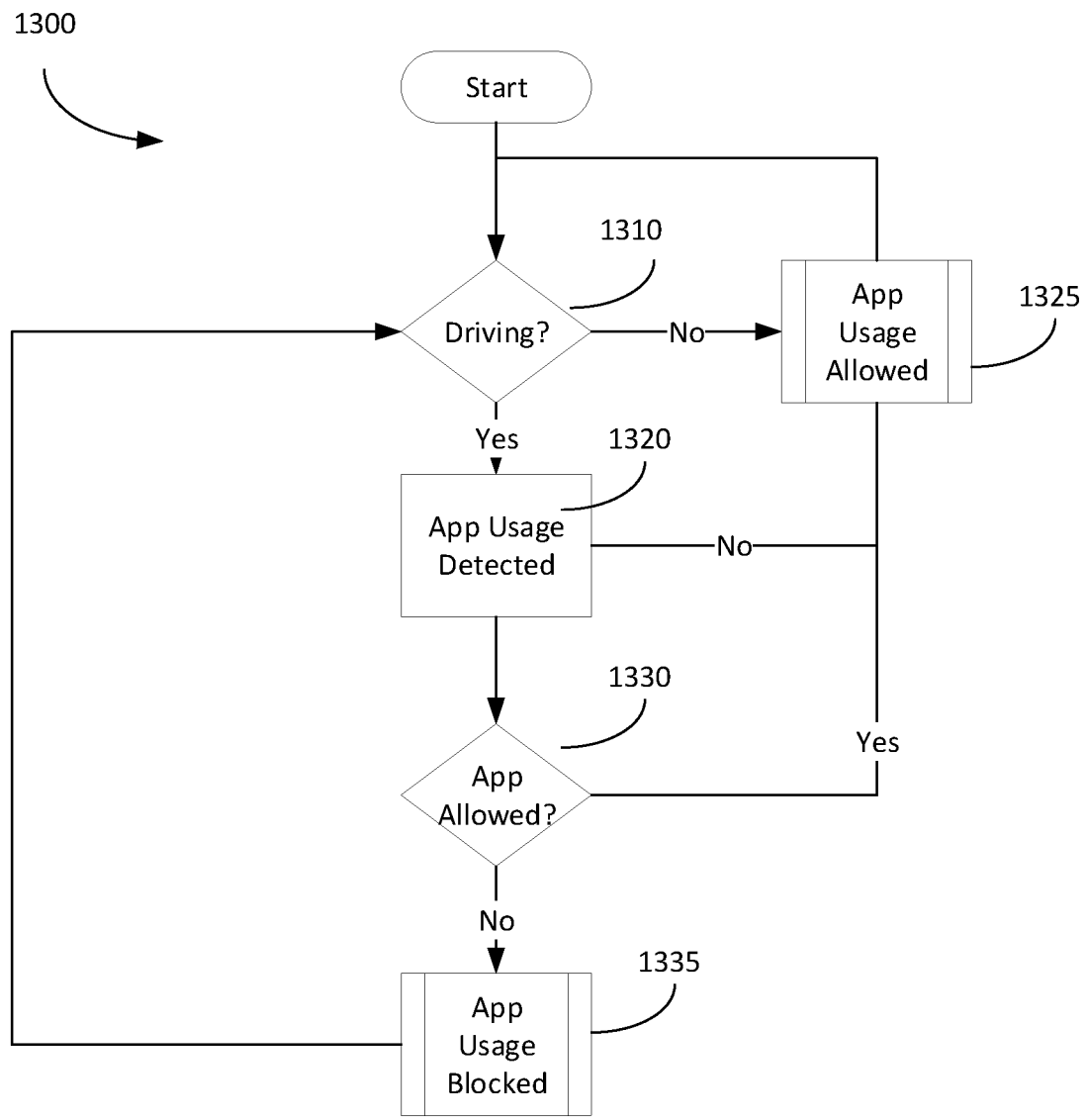
FIG. 13 shows still another exemplary flow chart of a method for controlling usage of the user device according to one embodiment.

FIG. 13 shows an exemplary flow chart of a method for controlling usage of device 110 when the device 110 is operating in Driving Mode. Method 1300 starts in block 1310, where the method detects that the user is driving and enters the Driving Mode. At block 1320, method 1300 detects that user is trying to launch an app and at block 1330 determines whether to allow (block 1325) or disallow (block 1335) the usage based upon a list that this automatically determined or provided by the user.

Walking Mode

In one embodiment, system 100 detects the user of the device 110 is walking and allows only navigation and music apps and blocks usage of remaining apps. This usage control mode may be referred to as "Walking Mode". This mode allows a distraction-free and safe operating mode. In one embodiment, system 100 detects that a user of device 110 is walking based on a change of location of device 110 and/or a rate of change (which may be a slower rate of change as compared to Driving Mode). In one embodiment, system 110 determines that user is walking based upon an update received from a fitness tracker (e.g., Fitbit, etc.) or a physical tracking device. Once the system 100 detects that the user is walking, it may block all distracting apps (e.g., social media, news, etc.) and provide a safer walking environment.

Figure 14:
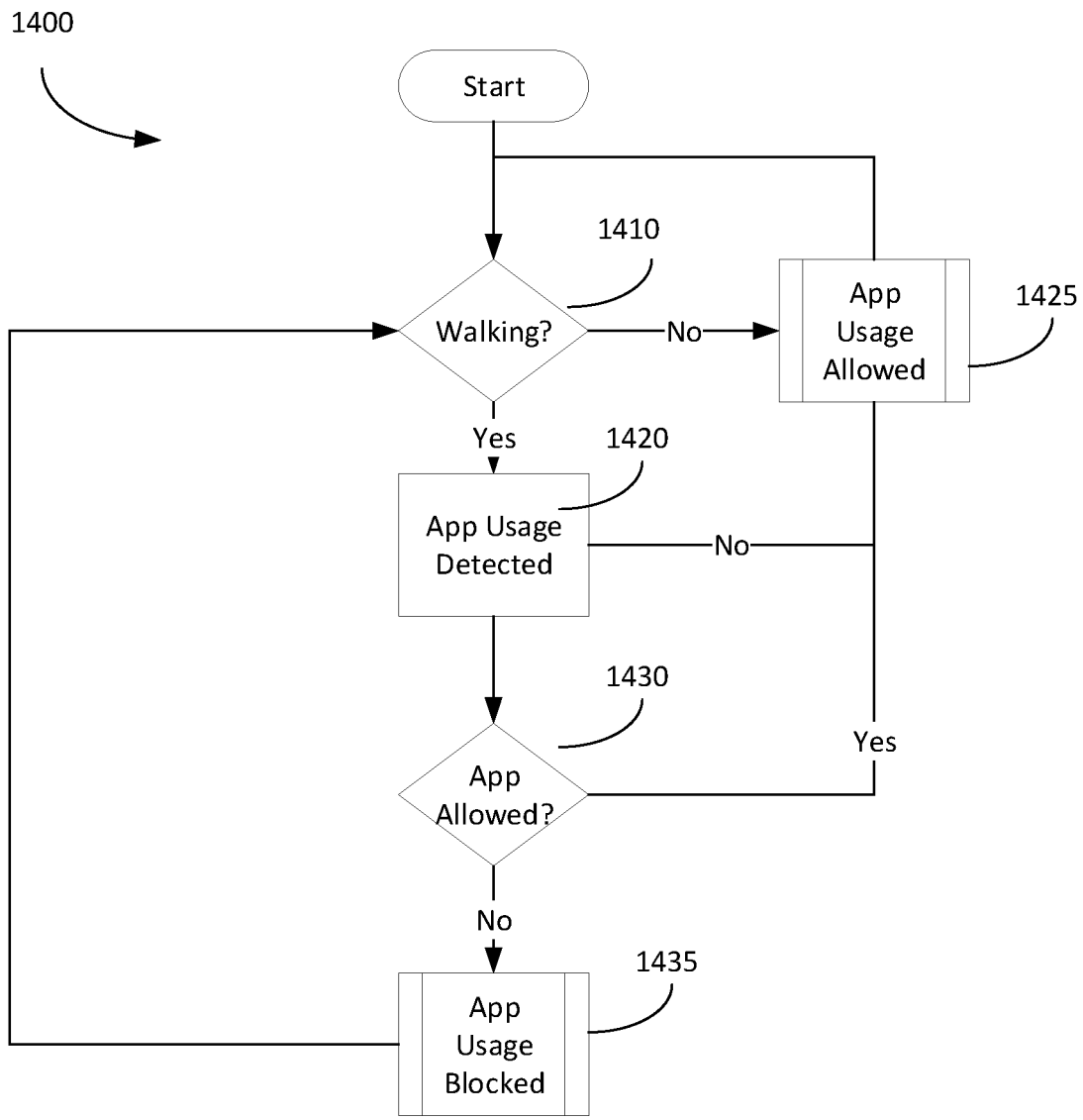
FIG. 14 shows another exemplary flow chart of a method for controlling usage of the user device according to one embodiment.

FIG. 14 shows an exemplary flow chart of a method for controlling usage of user device 110 when the device 110 is operating in Walking Mode. Method 1400 starts in block 1410, where method 1400 detects that the user is walking and enters the Walking Mode. At block 1420, method detects that user is trying to launch an app and at block 1430 determines whether to allow (block 1425) or disallow (block 1435) the usage based upon a list of apps that is automatically determined or provided by the user.

In one embodiment, location of the user is identified using an OS-supplied functionality on the user devices. For example, geo-fence may be used to define virtual boundaries of physical locations. Examples may include: home, office/work, school, etc. FIG. 11A is exemplary implementation of location information, and shows locations that represent location information of user of device 110.

In one embodiment, operating systems provide an application programming interface (API), which enabled applications to receive the current location/geo-fence, and notifications when a user enters or exits a geo-fence. FIGS. 11B and 11C show exemplary algorithmic implementations to detect current location for iOS® and Android™ OS, respectively. In iOS®, for example, class name CLLocationManager can be used. Similarly, Android™ OS has a similar approach, where class named GeofencingClient can be used. In another embodiment, location and/or geo-fence information can be fetched from other sources that may include IP addresses, Wi-Fi hot spot information using a Wi-Fi monitor.

In one embodiment, Wi-Fi hotspot information of the device 110 is used to identify if the user is at home, school, work or any other location. This is provided by the OS running on the user device 110. A user may be presented with a list of Wi-Fi access points that are used on the user device and asked to map the access points with types of location. Examples are: home, office/work, school, etc. FIG. 12A is exemplary implementation of Wi-Fi information. Referring to FIG. 12A, the data types are used to define different types of Wi-Fi hotspot and how they map to location information of the user of device 110.

In one embodiment, operating systems provide API, which enabled applications to receive the current Wi-Fi hot spot information, and notifications when a user joins and leaves a mapped location. FIGS. 12B, 12C and 12D show exemplary algorithmic implementations for Wi-Fi connectivity changes on Android™ OS and iOS®. For example in Android™ OS, class name WifiInfo (android.net.wifi.WifiInfo) can be used. Similarly, iOS® also provides APIs to fetch current Wi-Fi information and changes in the state: NEHotSpotNetwork. In another embodiment, the Wi-Fi information can be fetched from other sources that might include IP address using a Wi-Fi monitor.

The processes or methods depicted in the preceding figures may be performed in part by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for controlling application usage on a user device, comprising:
   receiving usage information from the user device;
   determining whether one or more trigger criteria associated with a usage control mode are satisfied based on the received usage information;
   if the one or more trigger criteria are satisfied, controlling application usage on the user device according to the usage control mode, wherein controlling the application usage on the user device comprises:
      notifying a user of the user device that a group of applications on the user device will be disabled after an expiration of a first specific time period,
      controlling the user device to operate in a first state wherein usage of the group of applications is enabled for the first specific time period in the first state,
      after the first specific time period has expired, controlling the user device to operate in a second state wherein the usage of the group of applications is blocked for a second specific time period in the second state, and
      after the second specific time period has expired, in response to a selection from the user to skip operating the user device under the usage control mode, controlling the user device to operate in a third state that allows the usage of the group of applications; and
   otherwise if the one or more trigger criteria are not satisfied, allowing access to all applications on the user device.

2. The method of claim 1, wherein the selection is selectable for a maximum number of times per day.

3. The method of claim 1, wherein the first specific time period and the second specific time period are (i) configured by the user or (ii) automatically configured based on usage history.

4. The method of claim 1, wherein controlling the application usage on the user device according to the usage control mode further comprises: pausing the first specific time period in response to detecting that a screen of the user device is locked.

5. A computer-implemented method for controlling application usage on a user device, comprising:
   receiving usage information from the user device;
   determining whether one or more trigger criteria associated with a usage control mode are satisfied based on the received usage information;
   if the one or more trigger criteria are satisfied, controlling application usage on the user device according to the usage control mode, wherein controlling the application usage on the user device comprises:
      checking category information of an application currently being accessed on the user device,
      determining whether the category information matches a list of allowed applications, and
      blocking the application currently being accessed on the user device in response to determining that the category information does not match the list of allowed applications; and
   otherwise if the one or more trigger criteria are not satisfied, allowing access to all applications on the user device.

6. The method of claim 5, wherein determining whether the one or more trigger criteria associated with the usage control mode are satisfied is further based on a predefined schedule.

7. The method of claim 5, wherein the list of allowed applications includes educational applications.

8. The method of claim 5, wherein determining whether the one or more trigger criteria associated with the usage control mode are satisfied is further based on information indicating the user has logged onto a Wi-Fi access point associated with a work location.

9. The method of claim 8, wherein the list of allowed applications includes productivity and work-related applications.

10. The method of claim 5, wherein determining whether the one or more trigger criteria associated with the usage control mode are satisfied is further based on at least one of: location information that matches a home of the user, a connection to a home Wi-Fi of the user, a time period during family hours, or information indicating more than one family member is located at the user's home.

11. The method of claim 10, wherein the list of allowed applications includes only critical applications.

12. The method of claim 1, wherein the usage control mode is a smart mornings mode, a school mode, a work mode, a family mode, a study mode, a driving mode, or a walking mode.

13. The method of claim 1, wherein the one or more trigger criteria comprise one of following:
  (i) a detection of a first usage of the day, and a lock state of the user device,
  (ii) a detection that the user is in school, a manually set school schedule, and a school access point connection,
  (iii) a detection that the user is in a work place, a manually set work schedule, and a work access point connection,
  (iv) a specific time period, location information indicating the user is at home, a home access point connection, and a detection that more than one family members are in a same location,
  (v) a manually set study schedule, and usage of homework or study application,
  (vi) a change in location, a rate of change in the location, and a wireless connectivity to a vehicle's entertainment system, or
  (vii) a change in location, and an update received from a fitness tracker or a physical tracking device.

14. The method of claim 1, wherein the group of applications comprises social media, news or messaging applications.

15. The method of claim 1, wherein the usage information comprises network traffic information, a lock state of a screen of the user device, and a time of day.

16. A system, comprising:
  a processor,
  a memory coupled to the processor for storing instructions, which when executed by the processor, causes the processor to perform operations, the operations comprising:
  receiving usage information from a user device;
  determining whether one or more trigger criteria associated with a usage control mode are satisfied based on the received usage information;
  if the one or more trigger criteria are satisfied, controlling application usage on the user device according to the usage control mode, wherein controlling the application usage on the user device comprises:
    notifying a user of the user device that a group of applications on the user device will be disabled after an expiration of a first specific time period,
    controlling the user device to operate in a first state wherein usage of the group of applications is enabled for the first specific time period in the first state,
    after the first specific time period has expired, controlling the user device to operate in a second state wherein the usage of the group of applications is blocked for a second specific time period in the second state, and
    after the second specific time period has expired, in response to a selection from the user to skip operating the user device under the usage control mode, controlling the user device to operate in a third state that allows the usage of the group of applications; and
  otherwise if the one or more trigger criteria are not satisfied, allowing access to all applications on the user device.

17. The system of claim 16, wherein the selection is selectable for a maximum number of times per day.

18. The system of claim 16, wherein the first specific time period and the second specific time period are (i) configured by the user or (ii) automatically configured based on usage history.

19. The system of claim 16, wherein controlling the application usage on the user device according to the usage control mode further comprises: pausing the first specific time period in response to detecting that a screen of the user device is locked.

20. The system of claim 16, wherein the one or more trigger criteria comprise one of following:
  (i) a detection of a first usage of the day, and a lock state of the user device,
  (ii) a detection that the user is in school, a manually set school schedule, and a school access point connection,
  (iii) a detection that the user is in a work place, a manually set work schedule, and a work access point connection,
  (iv) a specific time period, location information indicating the user is at home, a home access point connection, and a detection that more than one family members are in a same location,
  (v) a manually set study schedule, and usage of homework or study application,
  (vi) a change in location, a rate of change in the location, and a wireless connectivity to a vehicle's entertainment system, or
  (vii) a change in location, and an update received from a fitness tracker or a physical tracking device.

* * * * *